United States Patent
Minemura et al.

(10) Patent No.: US 10,611,367 B2
(45) Date of Patent: Apr. 7, 2020

(54) DRIVING ASSISTANCE DEVICE AND DRIVING ASSISTANCE METHOD

(71) Applicant: DENSO CORPORATION, Kariya, Aichi-pref. (JP)

(72) Inventors: Akitoshi Minemura, Kariya (JP); Takahiro Baba, Kariya (JP)

(73) Assignee: DENSO CORPORATION, Kariya, Aichi-pref ( * ) Notice: Subject to any disclaimer, the term of this patent is extended or adjusted under 35 U.S.C. 154(b) by 308 days.

(21) Appl. No.: 15/577,274

(22) PCT Filed: May 30, 2016

(86) PCT No.: PCT/JP2016/065884
§ 371 (c)(1),
(2) Date: Apr. 23, 2018

(87) PCT Pub. No.: WO2016/194867
PCT Pub. Date: Dec. 8, 2016

(65) Prior Publication Data
US 2018/0354506 A1   Dec. 13, 2018

(30) Foreign Application Priority Data
May 29, 2015  (JP) .................. 2015-109945

(51) Int. Cl.
*B60W 30/09* (2012.01)
*B60W 30/095* (2012.01)
(Continued)

(52) U.S. Cl.
CPC ............. *B60W 30/09* (2013.01); *B60R 21/00* (2013.01); *B60T 7/12* (2013.01); *B60T 7/22* (2013.01);
(Continued)

(58) Field of Classification Search
CPC .. B60T 7/22; B60T 2201/03; B60W 2420/52; B60W 2550/10; G06K 9/6215
See application file for complete search history.

(56) References Cited

U.S. PATENT DOCUMENTS

2009/0040094 A1* 2/2009 Harada ................... G01S 13/87
                                                          342/59
2014/0297171 A1* 10/2014 Minemura ............. G08G 1/166
                                                          701/301
(Continued)

FOREIGN PATENT DOCUMENTS

| JP | 4850963 B1 | 1/2012 |
| JP | 2015-046132 A | 3/2015 |
| WO | 2014/068669 A1 | 8/2014 |

*Primary Examiner* — Thomas G Black
*Assistant Examiner* — Ce Li Li
(74) *Attorney, Agent, or Firm* — Knobbe, Martens, Olson & Bear, LLP

(57) ABSTRACT

In a driving assistance device, A arrival position calculation unit specifies an object position on an XY plane, and calculates a predicted arrival position when an object arrives at an X axis based upon a calculated travel trajectory by calculating the travel trajectory of the object. An operation permission unit permits automatic brake operation based upon a collision determination between an own vehicle and the object, when the predicted arrival position falls within a range of an operation target width. An overlapping region extraction unit sets detection error regions on the XY plane, respectively, and extracts a region where both detection error regions set are overlapped with each other as an overlapping region. A setting unit enlarges an operation target width after an automatic-brake-operation start when a characteristic amount condition relating to a size of the overlapping region is satisfied.

18 Claims, 11 Drawing Sheets

(51) Int. Cl.
*B60T 7/12* (2006.01)
*G01S 13/86* (2006.01)
*G01S 13/58* (2006.01)
*G01S 13/93* (2020.01)
*B60R 21/00* (2006.01)
*G01S 13/72* (2006.01)
*B60T 7/22* (2006.01)
*G01S 7/40* (2006.01)
*G01S 13/931* (2020.01)
*G08G 1/16* (2006.01)

(52) U.S. Cl.
CPC ....... *B60W 30/0956* (2013.01); *G01S 7/4026* (2013.01); *G01S 13/58* (2013.01); *G01S 13/723* (2013.01); *G01S 13/867* (2013.01); *G01S 13/931* (2013.01); *B60T 2201/022* (2013.01); *B60T 2201/024* (2013.01); *B60W 2520/16* (2013.01); *B60W 2550/10* (2013.01); *B60W 2710/182* (2013.01); *G01S 13/86* (2013.01); *G01S 2007/4034* (2013.01); *G01S 2013/9346* (2013.01); *G01S 2013/9357* (2013.01); *G01S 2013/9375* (2013.01); *G08G 1/166* (2013.01)

(56) References Cited

U.S. PATENT DOCUMENTS

| | | | |
|---|---|---|---|
| 2015/0054673 A1* | 2/2015 | Baba | G01S 13/867 342/27 |
| 2015/0066348 A1* | 3/2015 | Baba | G08G 1/166 701/301 |
| 2015/0266456 A1* | 9/2015 | Inomata | G08G 1/165 701/70 |

* cited by examiner

DRIVING ASSISTANCE DEVICE AND DRIVING ASSISTANCE METHOD

CROSS-REFERENCE TO RELATED APPLICATION

This application claims priority to and the benefit of Japanese Patent Application No. 2015-109945 filed in the Japanese Intellectual Property Office on May 29, 2015, the entire contents of which are incorporated herein by reference.

Technical Field

The present invention relates to a driving assistance technology for avoiding a collision or for reducing collision damage by performing a collision determination between an own vehicle and an object ahead of the own vehicle and by operating an automatic brake on the basis of the determination result.

Background Art

Conventionally, when a collision probability is determined to be high according to a collision determination result by which a probability that an own vehicle collides with an object ahead of the own vehicle is determined, a pre-crash safety system (hereinafter referred to as "PCS (Pre-Crash Safety System)") by which an automatic brake being separately independent from driver's brake operation is performed, has been known. It is advantageously possible not only to avoid a collision between an own vehicle and an object ahead of the own vehicle, but also to reduce collision damage by operating the PCS.

For example, in the case of the PCS, when an object position is detected based upon an image of an own vehicle front captured by a camera (hereinafter referred to as "front image"), it is assumed that the object position may not be correctly detected from the front image due to a large pitching motion occurring in the own vehicle. In this case, it is proposed to change a method pertaining to a collision determination or to perform stopping the collision determination (refer to patent document 1).

More specifically, in a state where a pitch angle of the own vehicle or a pitch angular velocity thereof is greater than a prescribed threshold detection information (that is, a predetermined threshold detection information) including the object position based upon the front image may not be acquired. According to a technology disclosed in patent document 1, in a state where the detection information is acquired at a previous time, the collision determination is performed by using the previously acquired detection information when a predetermined setting time has not passed, whereas the collision determination stops when the predetermined setting time passes.

RELATED ART DOCUMENTS

Patent Document

[Patent Document 1] JP-A 4850963.

SUMMARY OF THE INVENTION

In the case of a conventional PCS, for example, even when a large pitching motion occurs in an own vehicle due to automatic brake operation, a collision determination may not be performed depending on a passing of a setting time. For this reason, even though a collision probability is not actually changed to be high, the collision determination stops. Accordingly, a drawback that a phenomenon, where the automatic brake operation becomes released (that is, incorrect release of the automatic braking), unnecessarily occurs has been contemplated.

Furthermore, in the case of a conventional PCS, even when detection reliability relating to an object position is low, the collision determination may be continuously performed by using previously acquired detection information, depending on the passing of the setting time. For this reason, even though the collision probability is actually changed to be low, the collision determination is continuously performed such that a drawback having a probability that the unnecessary automatic brake operation may be continuously performed has been also contemplated.

According to embodiments of the present disclosure, an objective of the present invention is to provide a technology by which the incorrect brake release and the continuous operation of the unnecessary automatic brake is able to be preferably suppressed.

Means for Solving Problems

A driving assistance device of a first exemplary embodiment of the present disclosure is provided with a radar object acquisition means, an image object acquisition means, an arrival position calculation means, an operation permission means, an overlapping region extraction means, and a setting means. The radar object acquisition means is configured to acquire detection information including an object position detected based upon a reflected wave of a radar wave transmitted frontward an own vehicle. The image object acquisition means is configured to acquire detection information including a detected object position based upon an image capturing a frontward seen ahead from the own vehicle.

The arrival position calculation means is configured to specify the object position on an XY plane in a case where a vehicle width direction is defined as an X axis and a vehicular longitudinal direction is defined as a Y axis based upon an own vehicle position. Furthermore, the arrival position calculation means is configured to calculate a predicted arrival position when the object arrives at the X axis based upon a calculated travel trajectory by calculating the travel trajectory of the object on the XY plane based upon object positions specified a plurality of times.

The operation permission means is configured to permit automatic brake operation based upon a collision determination between the own vehicle and the object, when the predicted arrival position calculated by the arrival position calculation means falls within a range of a preset operation target width along the X axis from the own vehicle position.

The overlapping region extraction means is configured to set detection error regions on the XY plane, respectively, based upon the object position included in detection information acquired by the radar object acquisition means and the image object acquisition and configured to extract a region where both detection error regions set are overlapped with each other as an overlapping region.

The setting means is configured to perform an object width setting process which enlarges an operation target width in the operation permission means after an automatic-brake-operation start when a prescribed characteristic amount condition is satisfied, with respect to the characteristic amount relating to a size of an overlapping region extracted by the overlapping region extraction means.

According to the aforementioned configurations, the automatic brake operation is able to be continuously easily performed by enlarging the operation target width after the automatic-brake-operation start, based upon the size of the overlapping region including the detection error, with respect to the object position to be acquired based upon the radar wave and a front image, respectively. For this reason, for example, in a case where the detection reliability relating to the object position before the automatic-brake-operation start is high, even though the detection reliability becomes temporarily low due to the automatic brake operation, it is able to be configured for the automatic brake operation not to be easily released regardless of the setting time.

Furthermore, for example, in a case where the detection reliability relating to the object position before the automatic-brake-operation start is low, it is able to be configured for the operation target width after the automatic-brake-operation start not to be enlarged such that the automatic brake operation in this state is able to be configured not to be continuously easily performed.

Thus, according to the first exemplary embodiment, the automatic brake operation is able to be configured not to be easily released or not to be continuously easily performed, thereby preferably suppressing, that is, incorrect release of the automatic brake and the continuous operation of the unnecessary automatic brake.

Furthermore, according to a driving assistance method of the first exemplary embodiment of the present disclosure, the same effects as those described above in the driving assistance device of the first exemplary embodiment of the present disclosure are able to be accomplished by virtue of the aforementioned same reasons.

Furthermore, reference numerals in parentheses described within this page and the claims show corresponding relationships between described specific means in an exemplary embodiment to be described later as one condition, and are not intended to limit the technological scope of the present invention.

DESCRIPTION OF THE PREFERRED EMBODIMENTS

An exemplary embodiment of the present invention will be described more fully hereinafter with reference to the accompanying drawings, in which a plurality of exemplary embodiments of the invention are depicted.

1. A First Exemplary Embodiment 1-1. Overall Configuration

Figure 1:
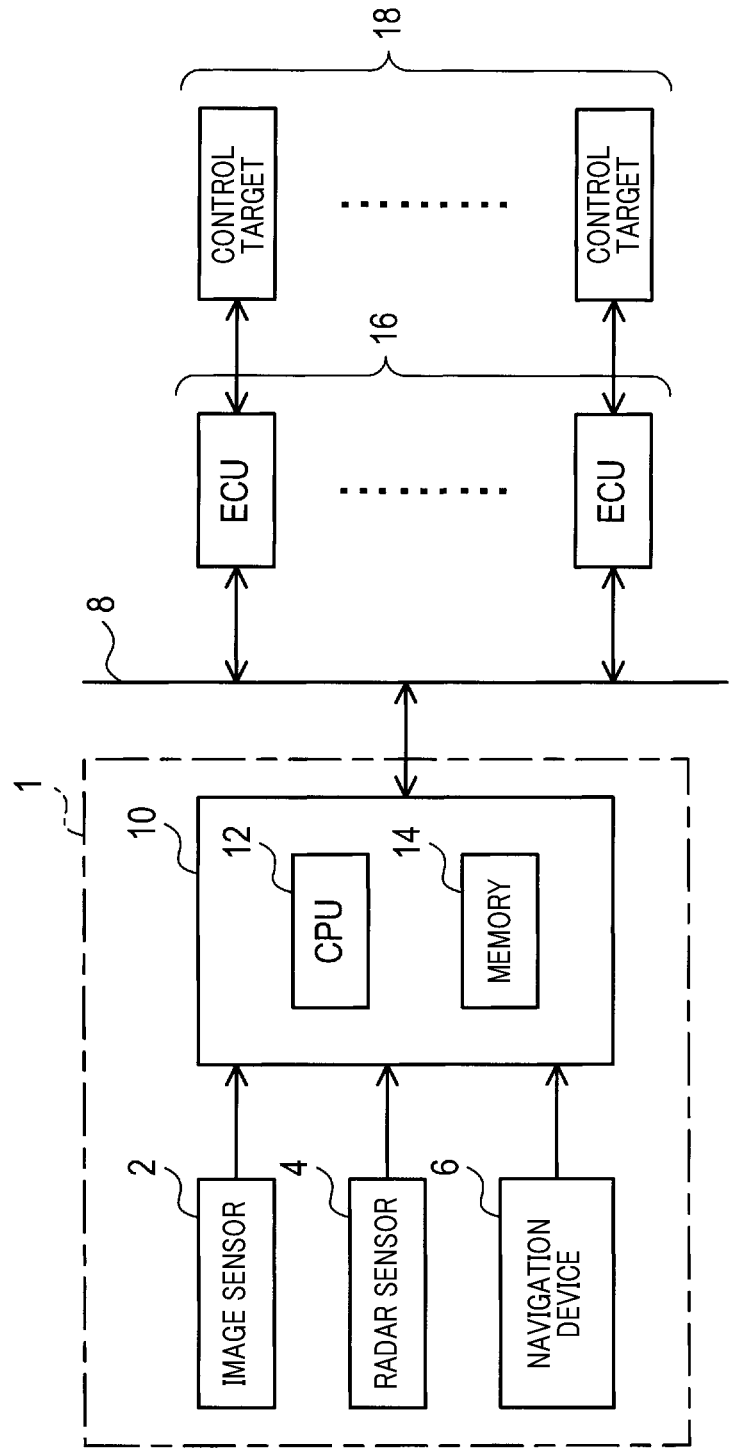
FIG. 1 is a block diagram illustrating a configuration of a driving assistance device 1.

A driving assistance device 1 depicted in FIG. 1 is provided with an image sensor 2, a radar sensor 4, a navigation device 6, and a driving assistance control unit 10. Furthermore, the driving assistance device 1 is connected to an in-vehicle local area network (hereinafter referred to as "in-vehicle LAN (Local Area Network)") 8. The in-vehicle LAN 8 is connected to a plurality of an electronic control units (hereinafter referred to as "ECU (Electronic Control Unit)") 16. Respective ECUs 16 are connected to respective control targets (targets to be controlled) 18 respectively corresponding to the respective ECUs 16 and respective sensors (not depicted) respectively corresponding thereto. A vehicle where the above-mentioned respective components are mounted or installed is hereinafter referred to as an own vehicle.

The respective ECUs 16, and the respective control targets (targets to be controlled) 18 corresponding to the respective ECUs 16 and the respective sensors corresponding thereto are components for respective vehicle control systems (not depicted). Furthermore, the respective vehicle control systems are well-known control systems mounted in advance in the vehicle, and are system where, for example, engine control and steering control, brake control, seat belt control, human machine interface control (hereinafter referred to as "HMI (Human Machine Interface)"), and the like are performed by the respective ECUs 16.

The respective control targets 18 are components controlled by the ECU 16. For example, various components such as an ignition mechanism and a fuel system for configuring an engine, an intake/exhaust system, a dynamic valve mechanism, a starting mechanism, a pump and a motor for configuring a steering system, an actuator for configuring a brake, a pretensioner for configuring a seat belt, a display device and an acoustic device for configuring a HMI, and the like exist. The respective sensors detect necessary information for controlling the ECU 16. For example, the necessary information such as a depression amount of an accelerator pedal, a steering amount, a depression amount of a brake, operation states of various switches, and a speed, a steering angle, an yaw rate, a pitch angle, a pitch angular velocity, and the like of the own vehicle are detected by the respective sensors. Furthermore, the pitch angle is an angle rotating in a vehicle height direction (that is, an up and down direction) based upon a vehicle width direction of the own vehicle (that is, a right and left direction) as an axis. For example, a rotation angle of an up direction is configured as a positive value, and a rotation angle of a down direction is configured as a negative value. Additionally, the pitch angular velocity is a pitch angle change per unit time.

The ECU 16 is mainly configured with a well-known micro-computer and a communication controller, and is configured to drive or output the control target 18 allotted in advance based upon detection information acquired by the respective sensors and vehicle information received from the in-vehicle LAN 8. Furthermore, the vehicle information is a piece of information shared between the ECU 16 including the driving assistance control unit 10 so as to accomplish optimization of whole in-vehicle control systems. For example, the vehicle information includes the detection information acquired by a sensor, command information to perform driving or outputting the control target 18 in the ECU 16, and the like.

The ECU 16, for example, performs an operation start and continuous operation or operation cancellation pertaining to a well-known collision avoidance brake for reducing collision damage (hereinafter referred to as "automatic brake"), which is independent from driver's brake operation, in accordance with the command information received from the driving assistance control unit 10 via the in-vehicle LAN 8. Furthermore, for example, in order for a driver to keep staying in a driver's seat while operating the automatic brake, the ECU 16 performs the operation start and the continuous operation or the operation cancellation pertaining to at least one pretensioner of a well-known tractor pretensioner, a buckle pretensioner, and a lap outer pretensioner. Furthermore, for example, the ECU 16 performs outputs of the display device, the acoustic device, and the like and performs an alarm due to vibrations of a steering wheel, and the like. The ECU 16 transmits a plurality of pieces of the detection information such as the speed, the steering angle, the yaw rate, the pitch angle, the pitch angular velocity, and the like of the own vehicle to the driving assistance control unit 10 via the in-vehicle LAN 8.

Furthermore, the in-vehicle LAN 18 is a local area network disposed inside the own vehicle, and, for example, is configured to transmit various vehicle information by means of communication protocols such as a well-known CAN (Controller Area Network) and FlexRay, LIN (Local Interconnect Network), MOST (Media Oriented Systems Transport), AVC-LAN (Audio Visual Communication-Local Area Network), and the like.

The navigation device 6, a well-known technology, not only displays a current position of the own vehicle together with a road map, but also performs a route guidance to a destination. More specifically, the navigation device 6 not only detects the current position of the own vehicle by using an arrival time of a wave received from a Global Positioning System (that is, GPS (Global Positioning System)) satellite, but also calibrates the current position thereof by using the speed, the yaw rate, and the like of the own vehicle. Furthermore, the navigation device 6 is provided with a map database (DB: Data Base) including road map information associated with pieces of information such as latitude, longitude, and the like. Additionally, the road map information is a tabular DB associated with link information of a link for configuring a road and node information of a node connecting the links. Since the link information includes a link length, a width, a connection node, curve information, and the like, a road shape is able to be detected by using the road map information. The navigation device 6 is configured for detection information including a road shape ahead of the own vehicle, which is detected based upon the current position of the own vehicle and the road map information, to be transmitted to the driving assistance control unit 10 via the in-vehicle LAN 8. Furthermore, with respect to other functions except a display function and a route guidance function from the navigation device 6, a well-known locator having the same functions as the navigation device 6 may be substituted for the navigation device 6.

The image sensor 2 captures a frontward from the own vehicle and detects a position, and the like of an object based upon the captured image (hereinafter referred to as "front image"). The image sensor 2, for example, is fixed by being adhered to an upper end portion of a front windshield in an inside of the vehicle in order for a lens of the image sensor 2 not to be exposed to wind and rain, and further not to block a driver's view. Furthermore, the image sensor 2, for example, is provided with a plurality of well-known imaging devices such as CMOS (Complementary Metal Oxide Semiconductor), CCD (Charge Coupled Device), and the like, and captures a region spreading in a predetermined angular range having an optical axis in a slightly horizontal downward direction in front of the own vehicle. A light incident from the front side of the own vehicle is photoelectrically converted by the imaging devices such that a read-out signal as a voltage of an accumulated electric charge is amplified. The amplified signal is converted to a digital image (that is, a front image) of a predetermined luminance gradation by A/D conversion.

Furthermore, the image sensor 2 detects an object shape from the front image by means of a well-known method. This detection method, for example, is performed by a matching process using an object model registered in advance. Since the object model is prepared in consideration of object types (for example, a vehicle, a pedestrian, a bicycle, and the like) and characteristics thereof (for example, a standard-sized car, a large-sized car, a compact-sized car, and the like), the object types and the characteristics thereof are specified. Furthermore, more detailed characteristics of the object are specified according to the shape, color, luminance, and the like of the object.

An X coordinate position (that is, a horizontal position) of the object and a Y coordinate position (that is, a vertical position) thereof where a road surface on an actual space is processed as a two-dimensional plane (that is, an XY plane in a case where the width direction of the own vehicle is described as an X axis and a vehicular longitudinal direction thereof is described as an Y axis) are detected, based upon a position of an up-and-down direction of the object on the front image that is detected by means of the aforementioned method, and a position of an infinite point (that is, FOE: Focus of Expansion). As described above, the object position detected by the image sensor 2 and the detection information showing the type of the object, the characteristic thereof, and the like are outputted to the driving assistance control unit 10 as image detection information. Meanwhile, in the case of the image sensor 2, when a bottom position of the object on the image is not correctly detected, detection accuracy of the vertical position deteriorates, which results in a characteristic that a detection error relating to an object distance becomes comparatively great. In order to compensate the detection error, a radar sensor 4 is able to be used.

Furthermore, the image sensor 2 is able to detect a lane boundary line such as a lane (that is, a lane of the own vehicle) on which the own vehicle is travelling, and the like from the captured front image. More specifically, the image sensor 2, for example, detects an edge by searching a region having luminance greater than a predetermined threshold in an upper direction from a bottom portion of a frame, based upon, for example, the luminance of image data. Since a white line has an edge having a high frequency component at opposite ends, a pick at the opposite ends of the white line is able to be obtained when a luminance value of the image data is differentiated with respect to the horizontal direction. A pixel where a gradient or difference of the luminance of the horizontal direction is greater than a predetermined value is the edge.

When the edges are tied up in the up-and-down direction of the front image, a white line component is able to be assumed, and with respect to the assumed white line component, the white line is determined by applying methods such as map matching, and the like in consideration of characteristics including a threshold of a white line width, a line shape, and the like. Additionally, a luminance weight of the image data is variably set for respective pixel colors of, for example, RBG (Red, Greed, Blue), and the like such that the lane boundary lines of a yellow line, a blue line, and other colors are also able to be determined by using the same method as that of the white line.

A model formula of the lane boundary line with respect to respective lanes is able to be acquired by extracting a plurality of edges that the lane boundary lines of the white line, and the like determined as described above have, and, for example, by performing a Hough transformation. The model formula shows positions of respective lane boundary lines of a right and a left side with respect to the respective lanes, and the coefficient further includes a plurality of pieces of information such as a vanishing point, a road curvature, a yaw angle, a width, an offset amount, and the like of respective lane boundary lines of the right and the left side. Accordingly, traffic line information shown by the model formula of respective lanes acquired by the image sensor 2 is outputted to the driving assistance control unit 10 as image detection information including the road shape ahead of the own vehicle.

Furthermore, the image sensor 2 includes a well-known function calculating an axial deviation direction and an axial deviation amount with respect to a prescribed reference axis (that is, a predetermined reference axis). For example, the image sensor 2 compares a position of the vanishing point of each lane boundary line of the right and left side, which is detected from the captured front image, with a position corresponding to the known FOE on the image, and when the two positions are not coincident with each other, the axial deviation direction of the image sensor 2 and the axial deviation amount thereof are calculated based upon a direction and an amount pertaining to the deviation. The axial deviation information showing the axial deviation direction and the axial deviation amount, which are calculated by the image sensor 2, is outputted to the driving assistance control unit 10, for example, in a state to be included in the image detection information.

That is, according to an exemplary embodiment, the image detection information outputted to the driving assistance control unit 10 from the image sensor 2 includes the object position (more specifically, the horizontal position of the object and the vertical position thereof), the detection information showing the type, characteristic, and the like of the object, lane information showing the road shape ahead of the own vehicle, and the deviation information showing the axial deviation direction of the image sensor 2 and the axial deviation amount thereof.

The radar sensor 4 is configured to detect a position of the object ahead of the own vehicle based upon a reflected wave of a radar wave. The radar sensor 4 is configured to transmit the radar wave representing, for example, a millimeter wave, a laser light, an ultrasonic wave, and the like, and configured to calculate a distance up to the object based upon a time until receiving the reflected wave where the transmitted radar wave is reflected by the object. Since object azimuth (in other words, an angle) with respect to the own vehicle is determined by a receiving direction of the reflected wave, the object position (that is, a relative position with respect to the own vehicle) is able to be specified by a calculated distance and angle.

The radar sensor 4 is installed inside, for example, a front grille of the vehicle, and transmits the radar wave in a direction of the own vehicle's front. In the case of the radar sensor 4, when the radar wave is irradiated while scanning a predetermined angle range of the right and left direction, centered at a front direction of the own vehicle, the predetermined angle range becomes an object detection range.

For example, the millimeter wave radar outputs a transmission wave in which frequency modulation is performed by a triangular wave, and receive the reflected wave that is reflected from the object ahead of the own vehicle by means of an antenna and mix it, thereby acquiring a beat signal. In the case of the beat signal, since a waveform is changed by interference generated according to the distance and a relative velocity up to the object, a relative distance and the relative velocity are calculated from the waveform. Furthermore, when the object exists in an irradiation direction of the transmission wave, the reflected wave is received such that a direction of the object existing ahead of the own vehicle is able to be detected.

The detection information showing the object position (more specifically, the object distance and azimuth) and the relative velocity that are detected by the radar sensor 4 are outputted to the driving assistance control unit 10 as radar detection information. Meanwhile, in the case of the radar sensor 4, since the receiving direction of the reflected wave is different depending on where the radar wave such as the millimeter wave, and the like is reflected from any portion of the object, the radar sensor 4 has a characteristic that a detection error relating to the horizontal position of the object becomes great in comparison with the detection error occurring by using the image sensor 2. In order to compensate for the detection error, the image sensor 2 is able to be used.

Furthermore, the radar sensor 4 includes a well-known function calculating the axis deviation direction and the axis deviation amount with respect to the prescribed reference axis. For example, the radar sensor 4 determines a stationery object based upon the calculated relative velocity and the own vehicle's speed, and calculates the axis deviation amount of the radar sensor 4 in the vehicle width direction of the own vehicle (that is, a horizontal direction) from moving vector of the determined stationery object. Additionally, for example, the radar sensor 4 calculates the axis deviation amount of the radar sensor 4 in the vehicle height direction (that is, a vertical direction) of the own vehicle from a receiving intensity change of road surface reflection. The axis deviation information showing the axis deviation direction and the axis deviation amount which are calculated by the radar sensor 4 is outputted to the driving assistance control unit 10, for example, in a state to be included in the radar detection information. Furthermore, the radar sensor 4 is configured to calibrate the axis deviation by moving an antenna position by means of the motor.

1-2. Configuration of the Driving Assistance Control Unit 10

The driving assistance control unit 10 is mainly configured with the well-known micro-computer and the communication controller including a CPU (Central Processing Unit) 12 and a memory 14 such as a RAM (Random Access Memory), a ROM (Read Only Memory), and the like, and the respective processes are performed by the CPU 12 based upon a program embedded in the memory 14. In addition, in the case of the driving assistance control unit 10, for example, one or more than two of the micro-computers may be provided thereto, and the installation position thereof, for example, may be any one of an inside of the image sensor 2 and an outside thereof.

Figure 2:
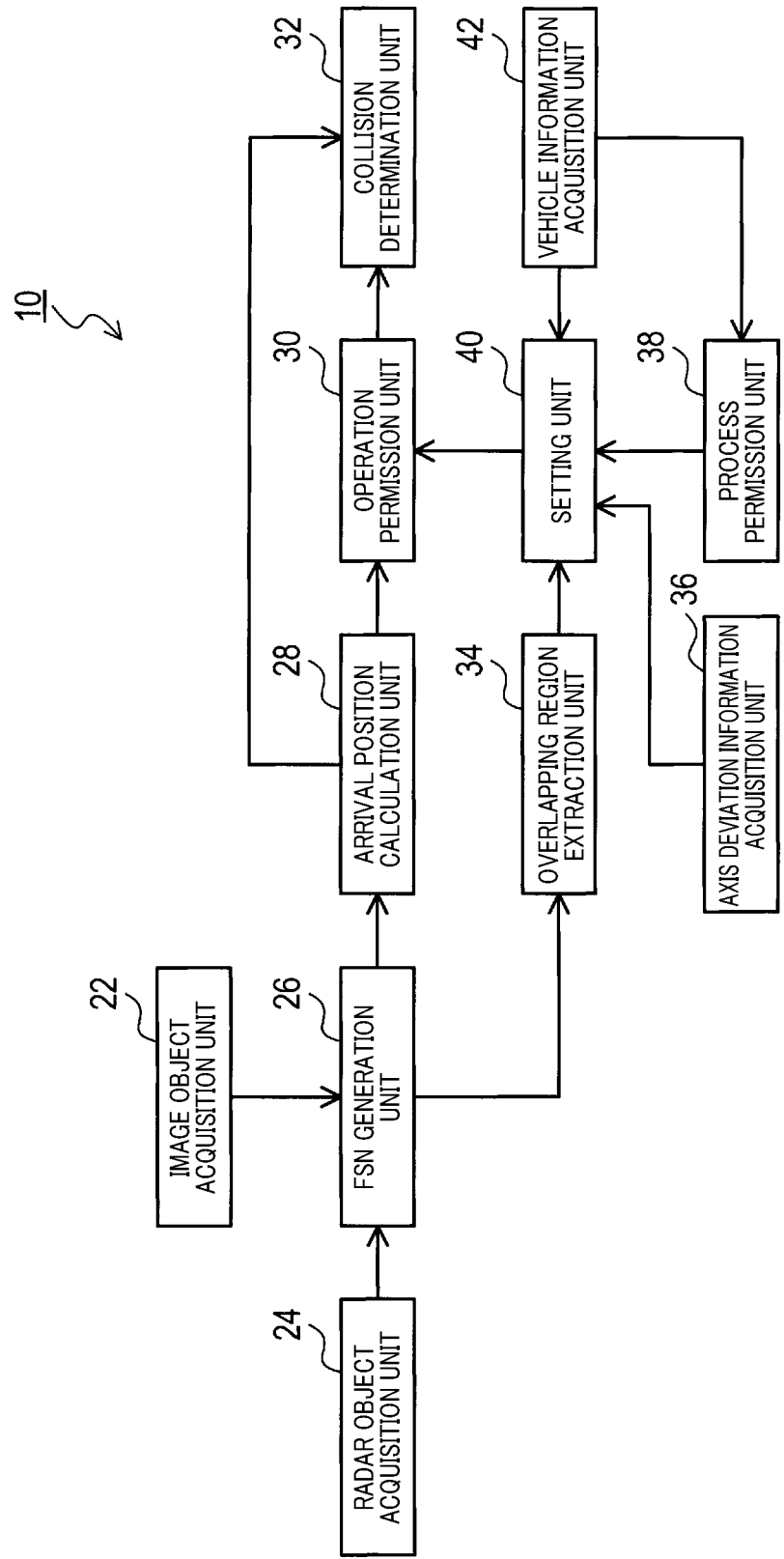
FIG. 2 is a block diagram illustrating a functional configuration of a driving assistance control unit 10.

The driving assistance control unit 10 is a functional configuration to be accomplished by performing the respective processes of the CPU 12 and, as depicted in FIG. 2, is provided with an image object acquisition unit 22, a radar object acquisition unit 24, a fusion (hereinafter referred to as "FSN (File System Navigator)") generation unit 26, an arrival position calculation unit 28, an operation permission unit 30, a collision determination unit 32, an overlapping region extraction unit 34, an axis deviation information acquisition unit 36, a process permission unit 38, a setting unit 40, and a vehicle information acquisition unit 42.

The vehicle information acquisition unit 42 includes a function acquiring the image detection information including the object position detected by the image sensor 2. More specifically, the image object acquisition unit 22 acquires the image detection information by being synchronized with an output of the image sensor 2, and transmits the acquired image detection information to the FSN generation unit 26.

The radar object acquisition unit 24 includes a function acquiring the radar detection information including the object position detected by the radar sensor 4. More specifically, the radar object acquisition unit 24 acquires the radar detection information by being synchronized with an output of the radar sensor 4, and transmits the acquired radar detection information to the FSN generation unit 26.

The axis deviation information acquisition unit 36 includes a function acquiring the axis deviation information showing the axis deviation direction and the axis deviation amount respectively calculated by the image sensor 2 and the radar sensor 4. More specifically, the axis deviation information acquisition unit 36 extracts the image detection information acquired by the image object acquisition unit 22 or the axis deviation information from the radar detection information acquired by the radar object acquisition unit 24, and transmits the extracted axis deviation information to the setting unit 40.

The vehicle information acquisition unit 42 includes a function respectively acquiring a plurality of pieces of the detection information such as the speed, the steering angle, the yaw rate, the pitch angle, the pitch angular velocity, and the like of the own vehicle from the ECU 16, and the detection information including the road shape ahead of the own vehicle from the image sensor 2 and the navigation device 6. More specifically, the vehicle information acquisition unit 42 transmits the detection information received via the communication controller from the in-vehicle LAN 8 to the setting unit 40, the process permission unit 38, and the like. The vehicle information acquisition unit 42 respectively transmits the detection information acquired by being synchronized with an output of the navigation device 6 and the lane information extracted from the image detection information acquired by the image object acquisition unit 22 to the process permission unit 38.

In order to compensate different kinds of detection errors that the image sensor 26 and the radar sensor 4 respectively have, the FSN generation unit 26 performs a sensor fusion such as a compound, a combination, a fusion or an association, and the like with respect to detection results of the image sensor 26 and the radar sensor 4, and includes a function generating information (hereinafter referred to as "FSN information") showing a position, and the like of a fused object. More specifically, the FSN generation unit 26 outputs the FSN information generated based upon the image detection information acquired by the image object acquisition unit 22 and the radar detection information acquired by the radar object acquisition unit 24 to the arrival position calculation unit 28 and the overlapping region extraction unit 34. Furthermore, when the FSN information is not able to be generated, a flag showing the aforementioned state is outputted to the overlapping region extraction unit 34, and at least one of the image detection information and the radar detection information together with the flag (more specifically, a piece of information including the object position specified on XY plane) is outputted to the arrival position calculation unit 20.

Figure 3:
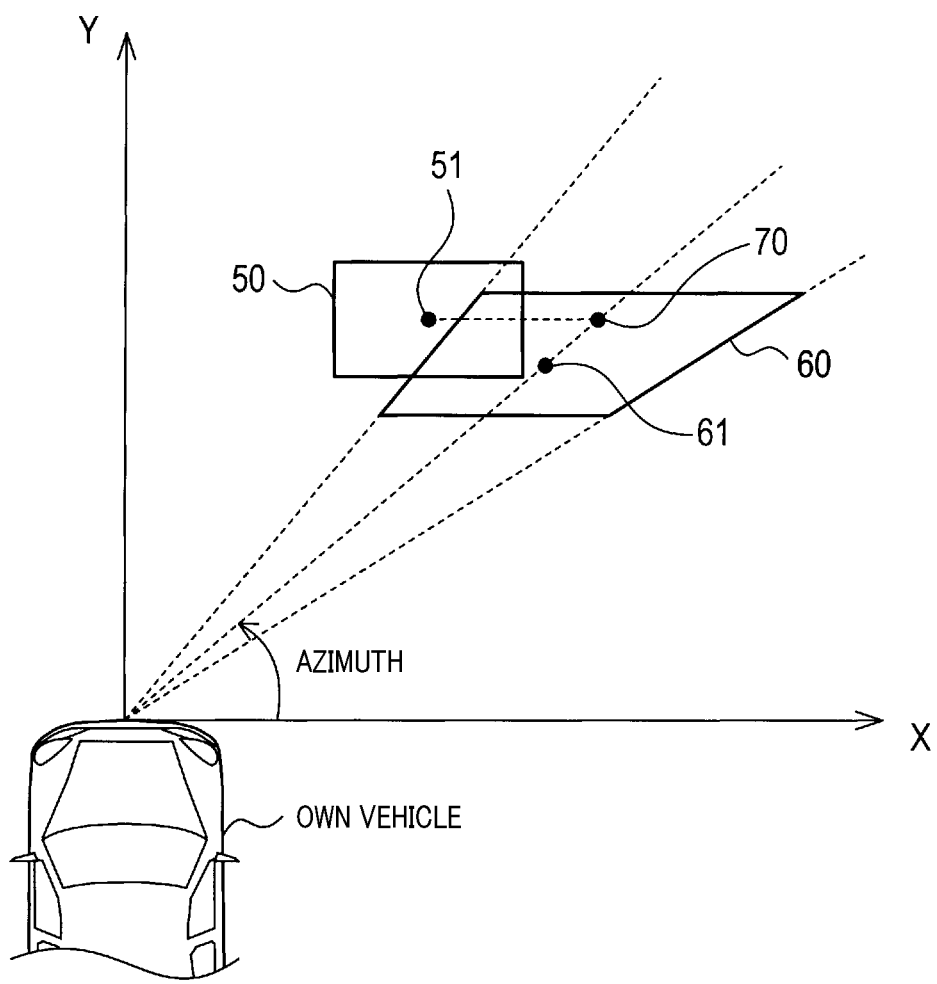
FIG. 3 is a drawing illustrating sensor fusion of detection information of an image sensor 2 and detection information of a radar sensor 4.

With respect to a FSN information generation method, as depicted in FIG. 3, for example, an object position 51 shown by the radar detection information and an object position 61 shown by the image detection information are respectively specified on the XY Plane in a case where the vehicle width direction (that is, a transverse direction) in which a tip center position of the own vehicle is an origin, is described as the X axis and the vehicular longitudinal direction (that is, a front direction) is described as the Y axis. That is, the object positions 51 and 61 are respectively specified as the relative position with respect to the tip center position of the own vehicle. Hereinafter, the object shown by the radar detection information is referred to as a radar object, and the object shown by the image detection information is an image object. Furthermore, the X axis, the Y axis, and the XY plane are used for convenient descriptions, and it may not be necessary to define the vehicle width direction as the X axis and to define the vehicular longitudinal direction as the Y axis. Thus, another two axes and another two-dimensional plane, considered to be substantially the same, may be also used. Furthermore, FIG. 3 depicts an example of an object positioned in front of the own vehicle but the right side thereof, and also a position is able to be specified with respect to an object positioned elsewhere.

Next, with respect to respective X and Y coordinates when the X coordinate of a radar object position 51 and the Y coordinate thereof are defined as reference coordinates, a region including a width of a preset assumed error (that is, an assumed error set in advance) based upon a characteristic of the radar sensor 4 is set as a radar detection error region 50. For example, when the radar object position 51 is described as Xr, Yr; an assumed error of the X coordinate is described as $\pm EXr$; and an assumed error of the Y coordinate is described as $\pm EYr$, the radar detection error region 50 describes that a range of the X coordinate is $Xr-EXr \leq X \leq Xr+EXr$; and a range of the Y coordinate is $Yr-EYr \leq Y \leq Yr+EYr$. Furthermore, a method of describing the radar detection error region 50 is not limited thereto, and the radar detection error region 50 may be also described by using, for example, the assumed error of the Y coordinate and an assumed error of an azimuth coordinate to be described later. The FSN information including the radar detection error region 50 to be set as described above is outputted to the overlapping region extraction unit 34.

Furthermore, with respect to respective X and Y coordinates when the X coordinate of an image object position 61 and the Y coordinates thereof are defined as reference coordinates, the region including the width of the preset assumed error based upon the characteristic of the image sensor 2 is set as an image detection error region 60. For example, when the image object position 61 is described as (Yi, θi); an assumed error of the Y coordinate is described as ±EYi; and an assumed error of an azimuth coordinate showing an inclination from an origin is described as ±Eθi, the image detection error region 60 describes that a range of the Y coordinate is Yi−EYi≤Y≤Yi+EYi; and a range of the azimuth coordinate is θi−Eθi≤θi≤θi+Eθi. Furthermore, a method of describing the image detection error region 60 is not limited thereto, and the image detection error region 60 may be also described by using, for example, the assumed error of the X coordinate and the assumed error of the Y coordinate. The FSN information including the image detection error region 60 to be set as described above is outputted to the overlapping region extraction unit 34.

Accordingly, for example, a position 70 specified with a Y coordinate of the radar object position 51 and an azimuth of the image object is specified as a position of the same object on the XY plane. Furthermore, the same object is able to be determined as an object where a radar object and an image object are the same in accordance with a position relationship between the radar detection error region 50 and the image detection error region 60. The FSN information including the specified object position is outputted to the arrival position calculation unit 28 and the overlapping region extraction unit 34.

The arrival position calculation unit 28 acquires the FSN information and the image detection information or the radar detection information from the FSN generation unit 26, and memorizes a detection position of the object ahead of the own vehicle into the memory 14 in chronological order (that is, in time series order) based upon the acquired information. Furthermore, a plurality of the detection positions of the objects memorized as described above are read out for every object and travel trajectories for the respective objects are calculated. That is, the arrival position calculation unit 28 includes a function calculating the object travel trajectory on the XY plane based upon the object detection position shown by at least one piece of information of the FSN information, the image detection information, and the radar detection information. Furthermore, the travel trajectory is a straight line or a curve line on the XY plane, which is calculated based upon a plurality of the detection information, and, for example, is an approximately straight line or an approximately curve line where an average value of squared distances from the respective detection positions becomes a minimum.

Furthermore, the arrival position calculation 28 includes a function calculating a predicted arrival position when the object arrives at the x axis based upon the travel trajectory calculated described above. In addition, the predicted arrival position is the horizontal position predicted when the object ahead of the own vehicle arrives at a tip position of the own vehicle in the future, and, more specifically, is calculated by an intersection point of the travel trajectory and the X axis depicted in FIG. 4 on the XY plane (that is, the X coordinate when the Y coordinate is 0). The information showing the predicted arrival position calculated as described above is outputted to the operation permission unit 30.

Figure 4:
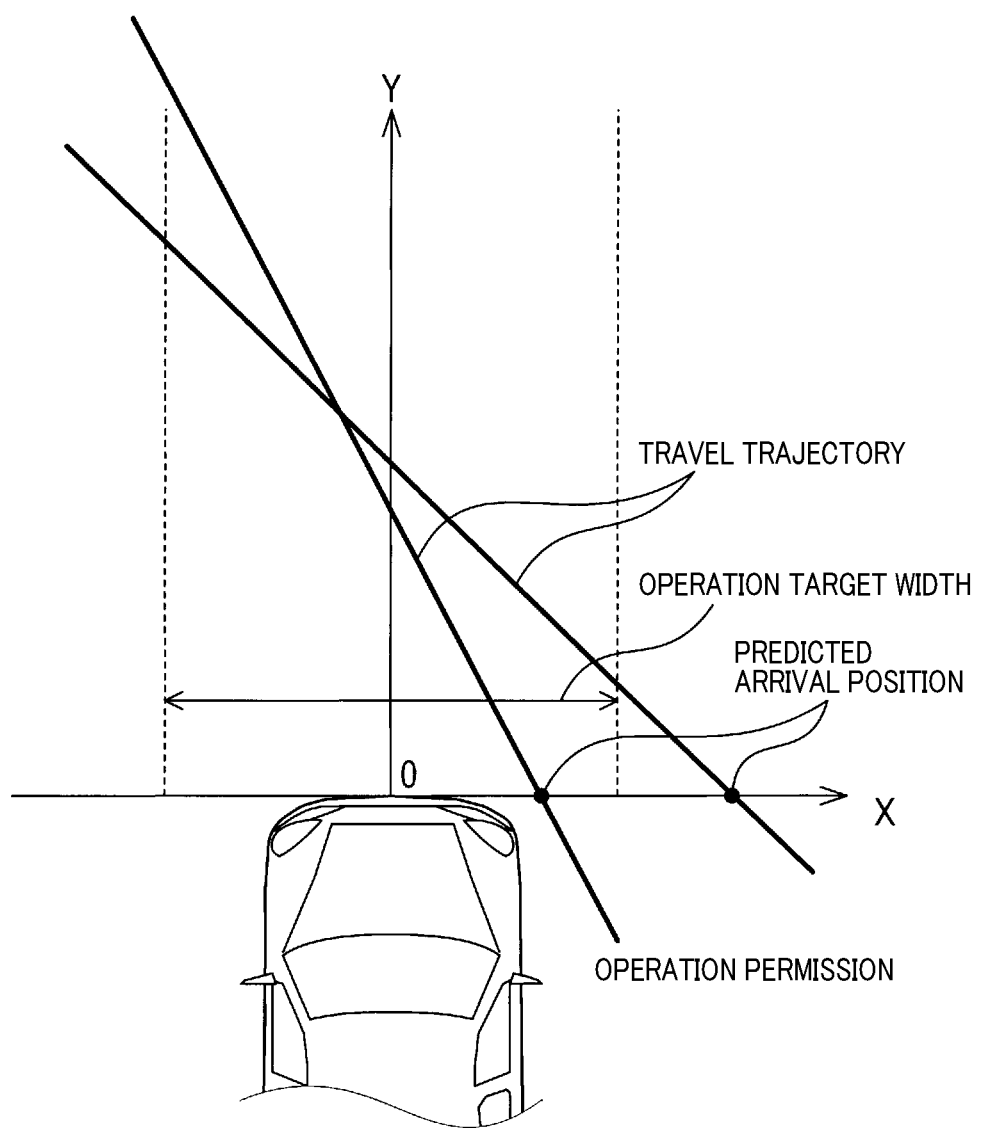
FIG. 4 is a first drawing illustrating a travel trajectory, a predicted arrival position, and an operation target width.

The operation permission unit 30 includes a function determining whether or not the predicted arrival position of the object ahead of the own vehicle falls within a range of a preset operation target width (that is, an operation target width set in advance) along the X axis from the tip center position of the own vehicle depicted in FIG. 4, based upon output information from the arrival position calculation unit 28. Furthermore, the operation target width is a preset regulation value (that is, a regulation value set in advance) in order to determine whether or not to be a target object for operating the PCS with respect to the object ahead of the own vehicle. The operation target width is, at least, greater than the vehicle width of the own vehicle, and, for example, a value adding a predetermined margin to the vehicle width is set as the usual operation target width.

More specifically, when the operation permission unit 30 determines that the predicted arrival position falls within the range of the operation target width, an operation permission notification to the collision determination unit 32 is performed, whereas when the operation permission unit 30 determines that the predicted arrival position is out of the range of the operation target width, an operation prohibition notification to the collision determination unit 32 is performed. Additionally, while the speed of the own vehicle is greater than 0 (for example, until a state where the own vehicle becomes completely stationary even after the automatic brake is operated), the aforementioned determinations and the notifications are repeatedly performed. Furthermore, the operation permission unit 30 receives a setting command, by which the operation target width after an automatic-brake-operation start is enlarged or reduced, from the setting unit 40. Accordingly, the operation permission unit 30 is configured to change the operation target width when receiving the notification of the automatic-brake-operation start from the collision determination unit 32.

The collision determination unit 32 includes a function performing a collision determination between the object and the own vehicle, and outputting a command pertaining to the automatic brake operation, and the like at a timing based upon the aforementioned collision determination result. More specifically, the collision determination unit 32 is accomplished by performing, for example, a collision determination process, which is performed by the CPU 12, depicted by a flow chart in FIG. 5 for every object ahead of the own vehicle. The collision determination process will be described later more in detail.

The overlapping region extraction unit 34 acquires the FSN information and the image detection information or the radar detection information from the FSN generation unit 26, and extracts a region where the radar detection error region 50 and the image detection error region 60 are overlapped each other on the XY plane as an overlapping region, based upon the acquired FSN information. The overlapping region extraction unit 34 includes a function storing a piece of information showing the overlapping region extracted for every object into the memory 14 in chronological order.

The process permission unit 38 acquires the detection information and the lane information from the vehicle information acquisition unit 42, and determines whether or not the own vehicle is going straight based upon the acquired information. A function of the process permission unit 38 is that when determining the own vehicle is travelling straight, the process permission unit 38 permits performance processed by the setting unit 40, whereas when determining the own vehicle is not travelling straight, the process permission unit 38 stops the performance processed by the setting unit

40. The aforementioned determination may be performed, based upon at least a piece of information of the steering angle and the yaw rate of the own vehicle, or may be performed based upon the road shape ahead of the own vehicle. Furthermore, when determining the own vehicle is travelling straight, the process permission unit 38 permits performance processed by the collision determination unit 32, whereas when determining the own vehicle is not travelling straight, the process permission unit 38 stops the performance processed by means of the collision determination unit 32.

With respect to a characteristic amount relating to a size of the overlapping region extracted by the overlapping region extraction unit 34, the setting unit 40 includes a function enlarging the operation target width in the operation permission unit 30 after the automatic-brake-operation start when a prescribed characteristic amount condition (that is, a predetermined characteristic amount condition) is satisfied. More specifically, the setting unit 40 is accomplished by performing, for example, a target width setting process, which is performed by the CPU 12, depicted by a flow chart in FIG. 6, for every object ahead of the own vehicle. The target width setting process will be described later more in detail.

Figure 7:
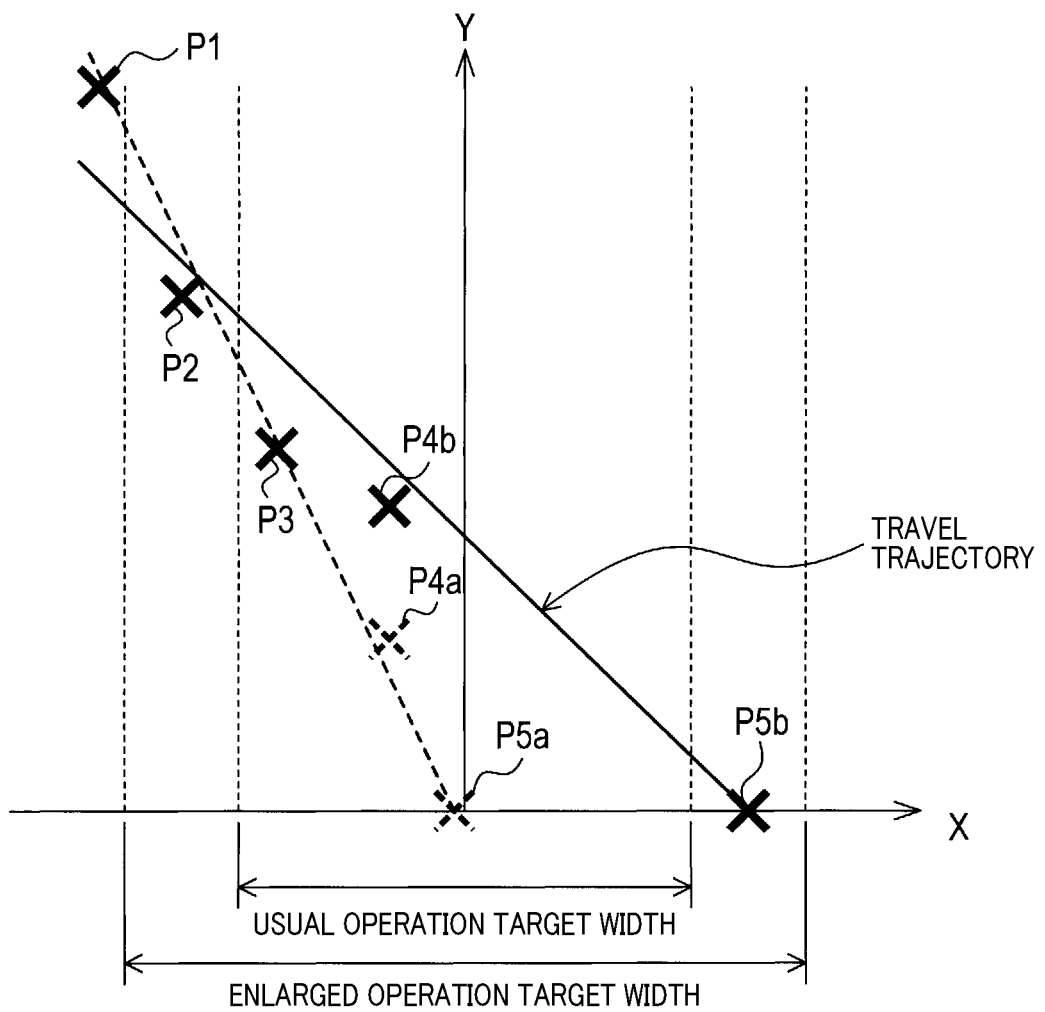
FIG. 7 is a second drawing illustrating a travel trajectory, a predicted arrival position, and an operation target width.

Hereinafter, a meaning of enlarging the operation target width after the automatic-brake-operation start will be described with reference to FIG. 7. Additionally, for example, FIG. 7 is illustrating a scene where a pedestrian is walking across a traveling lane of the own vehicle in front of the own vehicle. In the case of the aforementioned scene, when the own vehicle is travelling, the pedestrian, who is seen from the own vehicle, is shown as the pedestrian is coming toward the own vehicle. When a pedestrian position is moved from a point P1 to a point P3 on the XY plane, the travel trajectory is initially predicted to come close to a place in vicinity of the tip center portion of the own vehicle.

Here, for example, when the automatic brake starts to be operated between the point P3 and the point P4, a behavior change, where the own vehicle has a sudden plunge with the front of the own vehicle pointing downwards due to a sudden speed reduction, occurs. The behavior change is a type of a pitching motion and is called as a nose dip. Furthermore, after the nose dip occurs, the behavior change, where the own vehicle has a sudden plunge with the front of the own vehicle pointing downwards due to suspension operation, and the like, may occur. When the pitching motion occurs, an imaging region of the front image generated by the image sensor 2 installed at the front portion of the own vehicle such as the front windshield, and the like is also changed in an up and down direction such that the detection accuracy of the bottom position of the object on the image becomes deteriorated.

For this reason, even in a case where it is originally predictable that the pedestrian position is moved from the point P3 to P4a and P5a, for example, when the bottom position of the object on the image shifts in a Y direction side such that error detection occurs, the pedestrian position seen from the own vehicle is shown being moved from the point P3 to P4b. In this case, when the travel trajectory is calculated by the points P1 to P3 and P4, a predicted arrival position P5b of the pedestrian becomes out of the range of the usual operation target width, and thus consequently the pedestrian in crossing becomes out of the operation target of the PCS such that the collision determination stops and the automatic brake may not be operated.

On the other hand, the predicted arrival position P5b falls within the range of the operation target width by enlarging the operation target width after the automatic-brake-operation start such that it is possible to cope with the aforementioned draw back. Meanwhile, the operation target width is not enlarged in all cases, and, for example, the operation target width after the automatic-brake-operation start is enlarged only in a case where detection reliability from the point P1 to the point P3 is determined to be high. Accordingly, it becomes possible to suppress continuity of the unnecessary automatic brake in scenes resulting from other causes.

In addition, the radar object acquisition unit 24, the image object acquisition unit 22, the arrival position calculation unit 28, the operation permission unit 30, the overlapping region extraction unit 34, and the setting unit 40 according to a first exemplary embodiment respectively correspond to a radar object acquisition means, an image object acquisition means, an arrival position calculation means, an operation permission means, an overlapping region extraction means, and a setting means disclosed in the claims. Furthermore, the process permission unit 38 corresponds to a process permission means disclosed in the claims.

1-2. Process 1-2-1. Collision Determination Process

Figure 5:
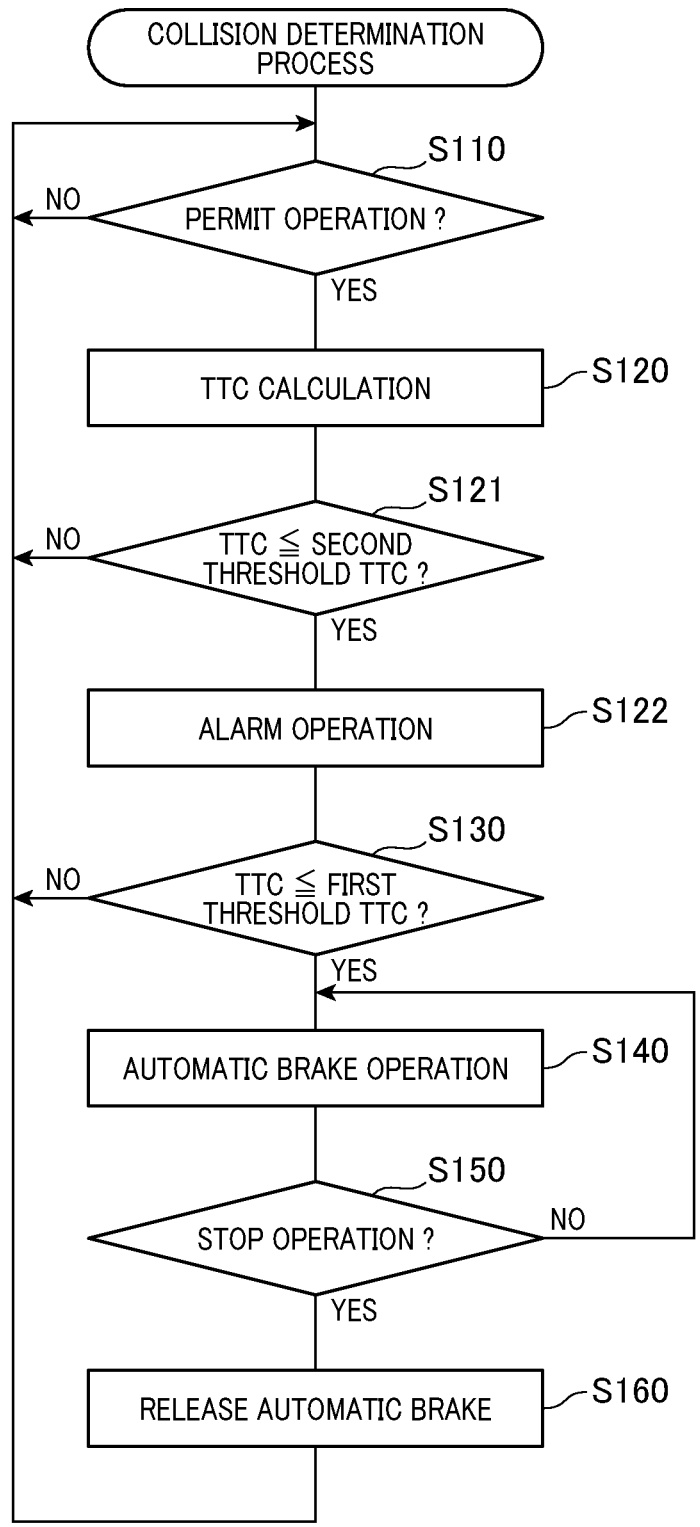
FIG. 5 is a flow chart illustrating a collision determination process.

Next, the collision determination process performed by the collision determination unit 32 will be described with reference to the flow chart in FIG. 5. Additionally, the process, for example, starts off when a vehicle speed exceeds a predetermined speed from a state where the own vehicle is completely stationary, and stops when the own vehicle is completely stationary.

When the process starts off, the collision determination unit 32 performs a determination relating to the operation permission at step S110, and when the operation prohibition notification is not acquired after the operation permission notification from the operation permission unit 30 is provided at step S110; YES, the process is moved to step S120. Furthermore, when the operation permission notification is not acquired after the operation prohibition notification from the operation permission unit 30 is provided at step S110; NO, the process is not moved to a next step and is on standby.

Next, the collision determination unit 32 calculates the time to collision (hereinafter referred to as "TTC (time to collision)"). The TTC is able to be obtained by dividing a distance between the object ahead of the own vehicle and the own vehicle by the relative velocity of the object with respect to the own vehicle. Furthermore, the TTC is an index for determining a probability that the own vehicle collides with the object ahead of the own vehicle, and another index other than the TTC may be used for determining the collision probability.

Next, the collision determination unit 32 determines whether or not the TTIC is lower than a second threshold TTC prescribed (that is, predetermined) as a greater value than a first threshold TTC at step S121. The first threshold TTC is a value assuming a case where a collision between the own vehicle and the object ahead of the own vehicle is not able to be avoided by the driver's brake operation, whereas the second threshold TTC is a value assuming a case where the collision between the own vehicle and the object ahead of the own vehicle is able to be avoided by the driver's brake operation. Furthermore, when determining that the TTC is lower than the second threshold TTC at step S121; YES, the collision determination unit 32 transmits command information for commanding an alarm operation start to the ECU 16 via the in-vehicle LAN 8 at step S122, and is moved to step S130, whereas when determining that the TTC is greater than the second threshold TTC at step S121; NO, the collision determination unit 32 returns to step S110 without moving to the next step.

Continuously, the collision determination unit 32 determines whether or not the TTC is lower than a prescribed first threshold TTC (that is, a predetermined first threshold TTC) at step S130. When the TTC is lower than the first threshold TTC at step S130; YES, the collision determination unit 32 transmits command information for commanding the automatic-brake-operation start to the ECU 16 via the in-vehicle LAN 8, and also performs the notification of the automatic-brake-operation start toward the operation permission unit 30 at step S140. Furthermore, when the command information relating to the automatic-brake-operation start is already transmitted, command information for commanding continuous automatic-brake-operation is transmitted to the ECU 16 via the in-vehicle LAN 8, whereas the notification of the automatic-brake-operation start is not performed. In addition, the collision determination unit 32 determines whether or not the operation prohibition notification is acquired from the operation permission unit 30 in the process of the automatic-brake-operation at step S150. When acquiring the operation prohibition notification at step S150; YES, the collision determination unit 32 transmits command information for commanding an automatic-brake-operation release to the ECU 16 via the in-vehicle LAN 8 and returns to step S110. Meanwhile, when not acquiring the operation prohibition notification at step S150; NO, the collision determination unit 32 returns to step S140 and performs the continuous automatic-brake-operation.

1-2-2. Target Width Setting Process

Figure 6:
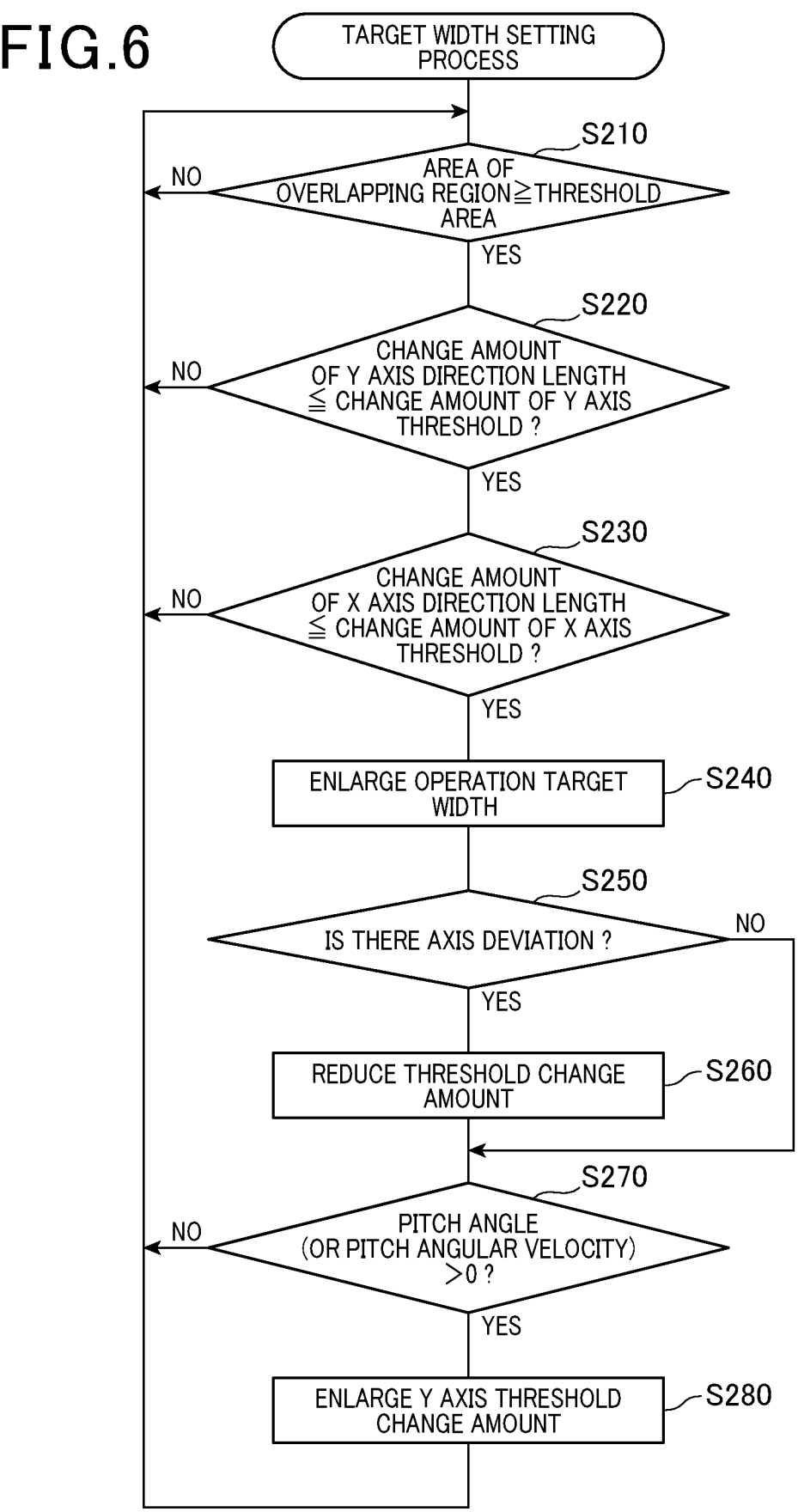
FIG. 6 is a flow chart illustrating a target width setting process in a first exemplary embodiment.

Next, a target width setting process performed by the setting unit 40 will be described with reference to the flow chart in FIG. 6. Furthermore, the process, for example, starts off when the vehicle speed exceeds the predetermined speed from the state where the own vehicle is completely stationary, and stops when the own vehicle is completely stationary.

Figure 8A:
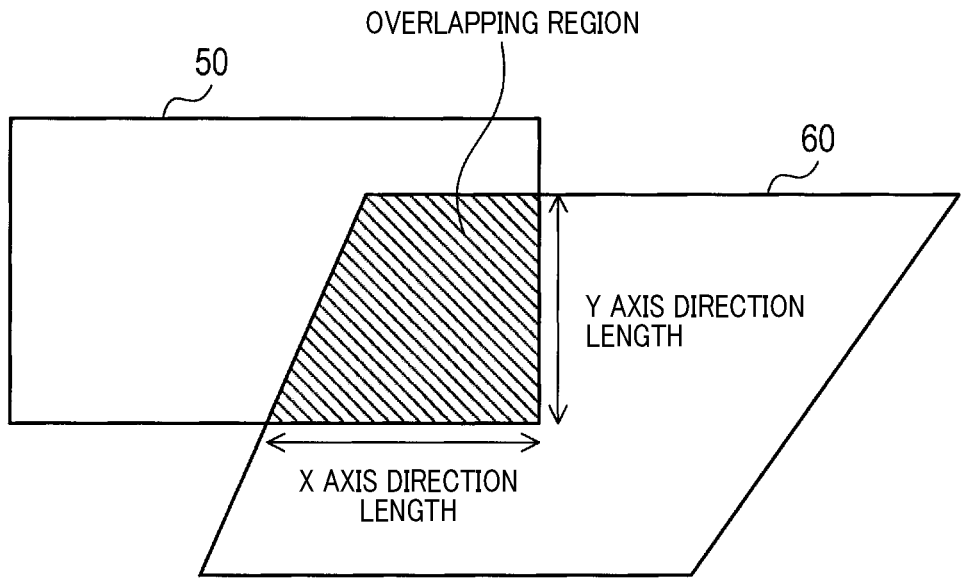
FIG. 8A is a drawing illustrating an overlapping region, an X-axial direction length and a Y-axial direction length.

When the process starts off, the setting unit 40, for example, reads out a piece of information showing the overlapping region with respect to the object, which is the operation target of the PCS, from the memory 14 in chronological order, and determines whether or not an area of a read-out overlapping region is greater than a prescribed threshold area (that is, a predetermined threshold area) at step S210. The threshold area is an area predetermined as one parameter showing the detection reliability according to the FSN information is high. Furthermore, as an index relating to the size of the overlapping region, for example, any one of X-axis direction lengths and any one of Y-axis direction lengths between an upper base of the overlapping region and a lower base thereof, depicted in FIG. 8(A), may be multiplied together instead of obtaining the area of the overlapping region. When the area of the overlapping region is determined to be greater than the threshold area, the process is moved to step S220, and when the area of the overlapping region is determined to be lower than the threshold area, the process dose not move to the next step and waits for the next command.

Figure 8B:
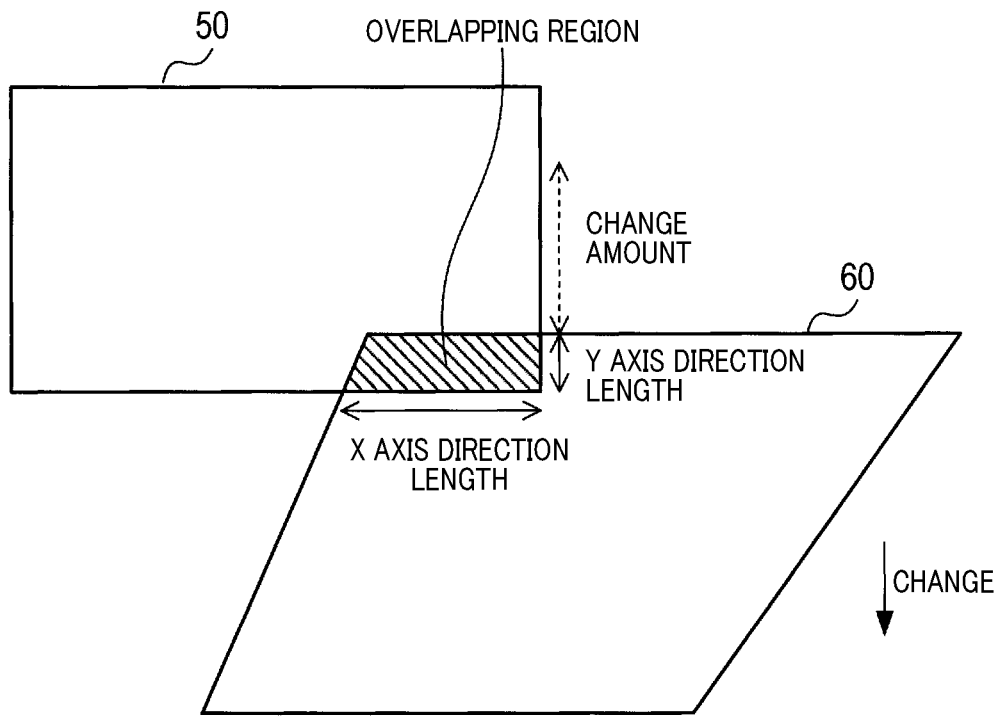
FIG. 8B is a drawing illustrating a change amount of the Y-axial direction length.

Next, it is determined whether or not a change amount between a value this time and a value at a previous time relating to the Y axis direction length of the read-out overlapping region at step S210 is lower than a prescribed Y axis threshold change amount at step S220. The prescribed Y axis threshold change amount is a permission change amount determined by predicting that an image detection error region 60 depicted in FIG. 8(B) is changed in any one of up and down directions after the automatic-brake-operation start. When the change amount is determined to be lower than the Y axis threshold change amount, the process is moved to step S230, and when the change amount is determined to be greater than the Y axis threshold change amount, the process returns to step S210.

Next, it is determined whether or not a change amount between a value this time and a value at a previous time relating to the X axis direction length of the read-out overlapping region at step S210 is lower than a prescribed X axis threshold change amount at step S230. The prescribed X axis threshold change amount is a permission change amount determined by predicting that the image detection error region 60 is hardly changed in right and left directions even after the automatic-brake-operation start. For this reason, the X axis threshold change amount is set as a value smaller than the Y axis threshold change amount. In other words, the Y axis threshold change amount is set as a value greater than the X axis threshold change amount. When the change amount is determined to be lower than the X axis threshold change amount, the process is moved to step S240, and when the change amount is determined to be greater than the Y axis threshold change amount, the process returns to step S210.

Next, the setting command, by which the operation target width after the automatic-brake-operation start is enlarged, is outputted to the operation permission unit 30 at step 240. A setting command is a command for enlarging the operation target width with respect to the usual operation target width (that is, an initial value), and, for example, includes quantitative information by which the width is enlarged by about 10% in comparison with the initial value.

Accordingly, when the characteristic amount condition relating to both the area and the change amounts of the Y axis direction length and the X axis direction length is satisfied as the characteristic amount relating to the size of the overlapping region, the operation target width after the automatic-brake-operation start is enlarged at steps S210 to S240. Without being limited to the aforementioned description, when the characteristic amount condition relating to one of the area and the change amounts of the Y axis direction length and the X axis direction length is satisfied, the operation target width after the automatic-brake-operation start may be also enlarged.

Continuously, the axis deviation information is acquired from the axis deviation information acquisition unit 36, and it is determined whether or not the axis deviation occurs at least one of the image sensor 2 and the radar sensor 4, based upon the acquired axis deviation information at step S250. When it is determined that the axis deviation occurs, the process is moved to step S260, and when it is determined that the axis deviation does not occur, the process is moved to step S270.

At step S260, at least one of the threshold change amounts corresponding to the axis deviation direction in the X axis threshold change amount and the Y axis threshold change amount is variably set to be reduced according to the axis deviation amount, based upon the axis deviation information at step S250. More specifically, as depicted in 9(A), as the axis deviation amount is great, the X axis threshold change amount and/or the Y axis threshold change amount is changed to a small value.

On the other hand, the detection information is acquired from the vehicle information acquisition unit 42, and it is determined that the pitch angle of the own vehicle or the pitch angular velocity thereof is greater than a predetermined value, based upon the acquired detection information at step S270. When the pitch angle or the pitch angular velocity is determined to be greater than the predetermined value, the process is moved to step S280, and when the pitch angle or the pitch angular velocity is determined to be lower than the predetermined value, the process is moved to step S210.

Figure 9A:
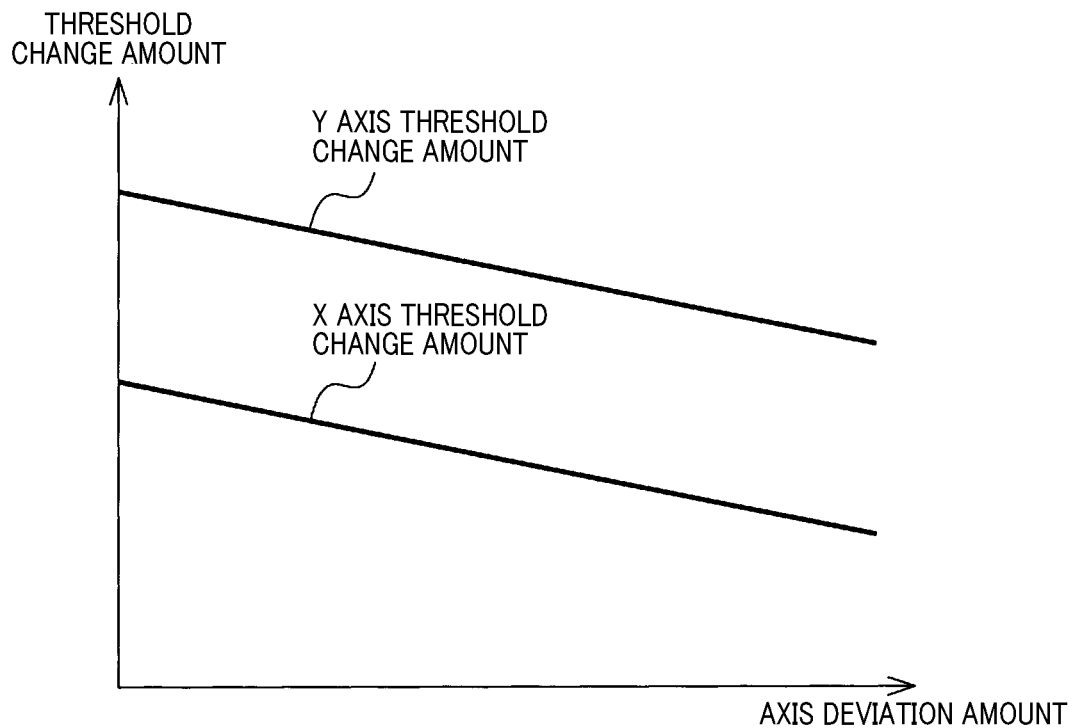
FIG. 9A is a drawing illustrating a relationship between an axial deviation amount and an X-axial threshold change amount, and between the axial deviation amount and a Y-axial threshold change amount.
Figure 9B:
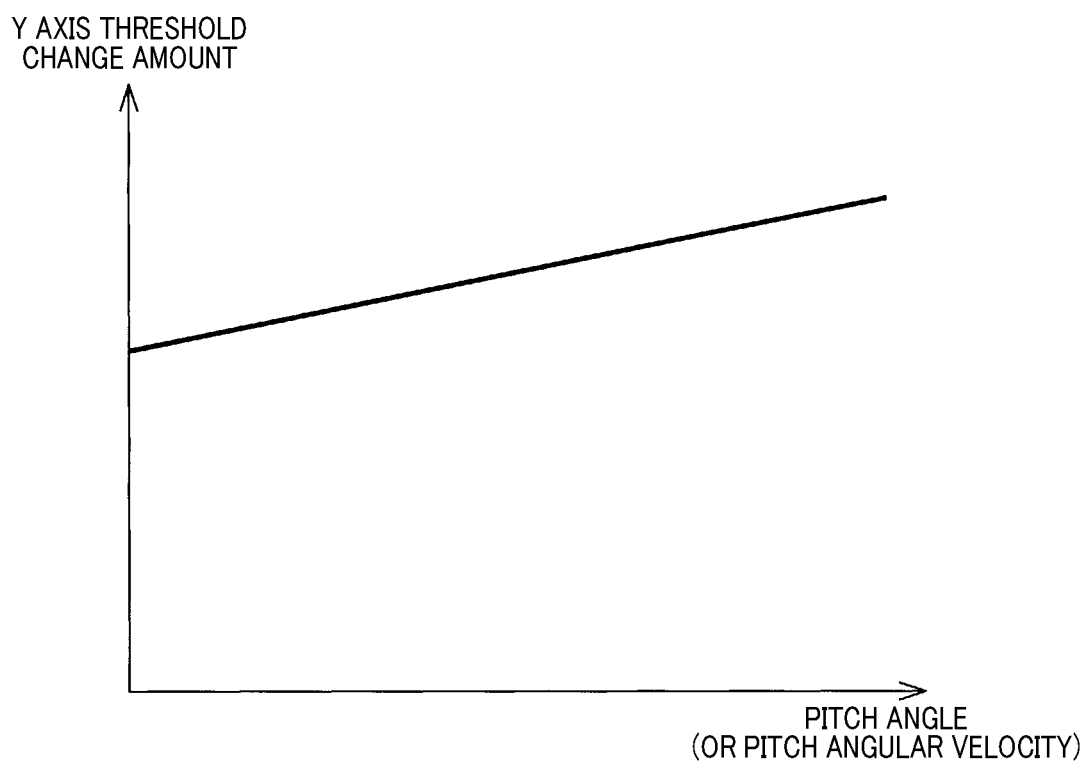
FIG. 9B is a drawing illustrating a relationship between a pitch angle and the Y-axial threshold change amount, or between a pitch angular velocity and the Y-axial threshold change amount.

At step S280, the process is variably set to enlarge the Y axis threshold change amount according to the pitch angle of the own vehicle or the pitch angular velocity thereof, based upon the detection information at step S270. More specifically, as depicted in FIG. 9B, as the pitch angle or the pitch angular velocity increases, the Y axis threshold change amount is also increased.

1-3. Effect

According to the first exemplary embodiment described above, effects are able to be accomplished as follows.

(1a) The automatic brake operation is able to be continuously easily performed by enlarging the operation target width after the automatic-brake-operation start, based upon the size of the overlapping region including the detection error, with respect to the object position to be acquired based upon the image sensor 2 and the radar sensor 4, respectively. For this reason, for example, in a case where the detection reliability relating to the object position before the automatic-brake-operation start is high, even though the detection reliability becomes temporarily low due to the automatic brake operation, it is able to be configured for the automatic brake operation not to be easily released regardless of the setting time. Furthermore, for example, in a case where the detection reliability relating to the object position before the automatic-brake-operation start is low, it is able to be configured for the operation target width after the automatic-brake-operation start not to be enlarged such that the automatic brake operation in this state is able to be configured not to be continuously easily performed. Thus, according to the detection reliability relating to the object position, the automatic brake operation is able to be configured not to be easily released or not to be continuously easily performed, thereby preferably suppressing, that is, the incorrect brake release and the continuous operation of the unnecessary automatic brake.

(2a) In the target width setting process, since a state, where the area of the overlapping region as the characteristic amount is greater than the threshold area, is a requirement for satisfying a characteristic amount requirement for enlarging the operation target width, the operation target width is able to be enlarged after the detection reliability relating to the object position is preferably evaluated.

(3a) In the target width setting process, since a state, where the change amounts of the X axis direction length and the Y axis direction length in the overlapping region as the characteristic amount are respectively lower than the X axis threshold change amount and the Y axis threshold change amount, is a requirement for satisfying a characteristic amount requirement for enlarging the operation target width, the operation target width is able to be enlarged after the detection reliability relating to the object position is preferably observed at both the X axis and the Y axis.

(4a) Since the Y axis threshold change amount is set to be a value greater than the X axis threshold change amount, the operation target width is able to be enlarged after preferably absorbing deterioration in the detection reliability caused by the pitching motion of the own vehicle.

(5a) In the target width setting process, for example, in a case where the deterioration of the detection reliability caused by the axis deviation of the radar sensor 4, and the like as another cause other than the pitching motion of the own vehicle occurs, the automatic brake operation is able to be configured not to be continuously easily performed, so as to reduce the threshold change amount corresponding to the axis deviation direction according to the axis deviation amount of the radar sensor 4.

(6a) In the target width setting process, the operation target width is able to be easily enlarged and also the automatic brake operation is able to be configured not to be easily released after more preferably absorbing the deterioration of the detection reliability caused by the pitching motion of the own vehicle, so as to enlarge the Y axis threshold change amount according to the pitch angle of the own vehicle and the pitch angular velocity thereof.

(7a) When the own vehicle is travelling straight, the operation target width is able to be enlarged after preferably suppressing a state where calculation accuracy of the object's travel trajectory is changed by behavior of the own vehicle, so as to permit execution of the target width setting process.

2. A Second Exemplary Embodiment

2-1. Differences Between the First and Second Exemplary Embodiments

In the second exemplary embodiment, basic configurations are the same as those of the first exemplary embodiment such that configurations therebetween in common will not be described and differences therebetween will be mainly described.

In the first exemplary embodiment described above, when it is determined that the deviation occurs and the pitch angle or the pitch angular velocity is greater than the predetermined value, the X axis threshold change amount and/or the Y axis threshold change amount is variably set in the target width setting process. Whereas, in this case, the operation target width is variably set in the second exemplary embodiment, which is different from the first exemplary embodiment.

2-2. Object Width Setting Process

Figure 10:
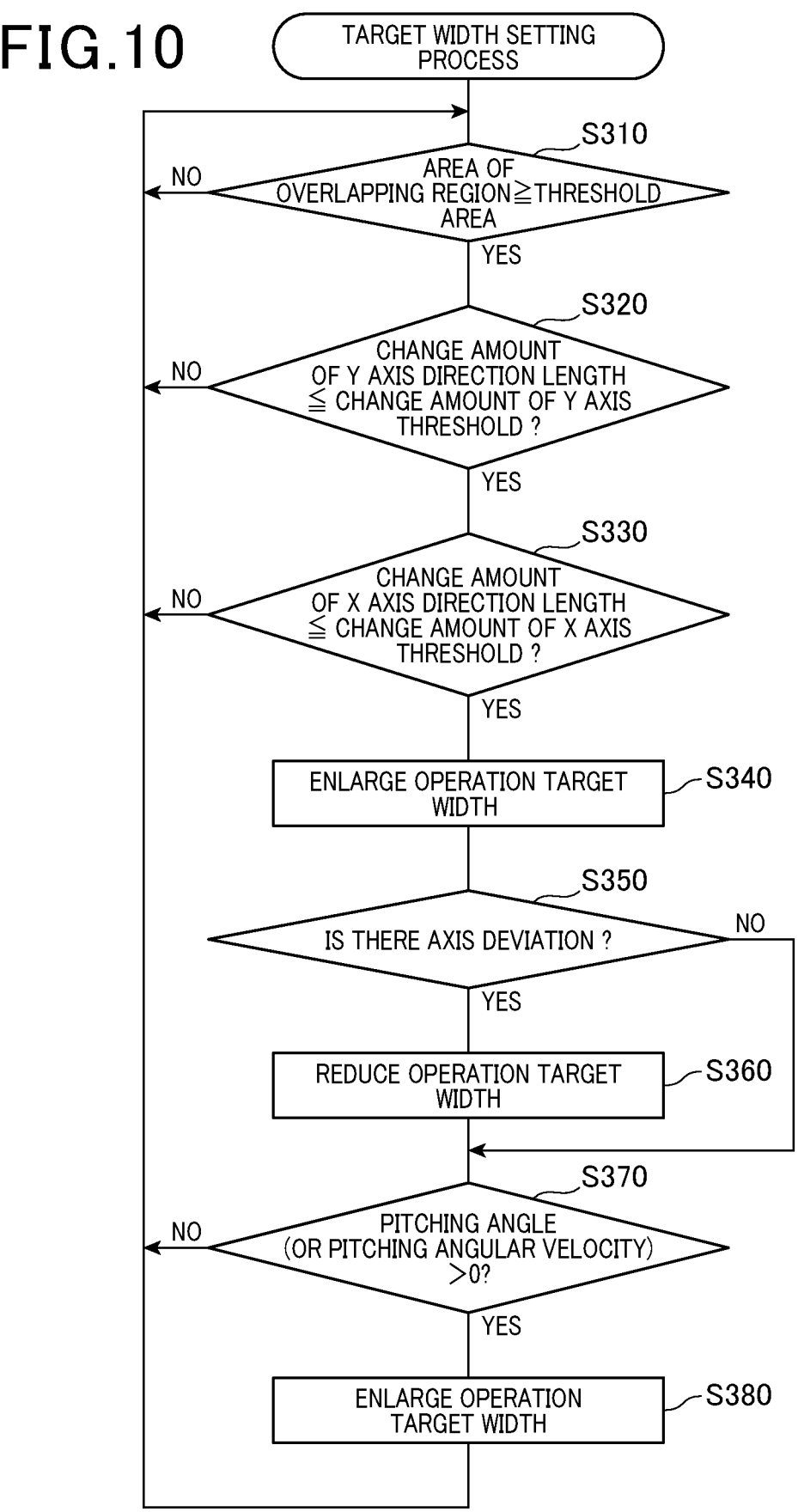
FIG. 10 is a flowchart illustrating a target width setting process in a second exemplary embodiment.
Figure 11A:
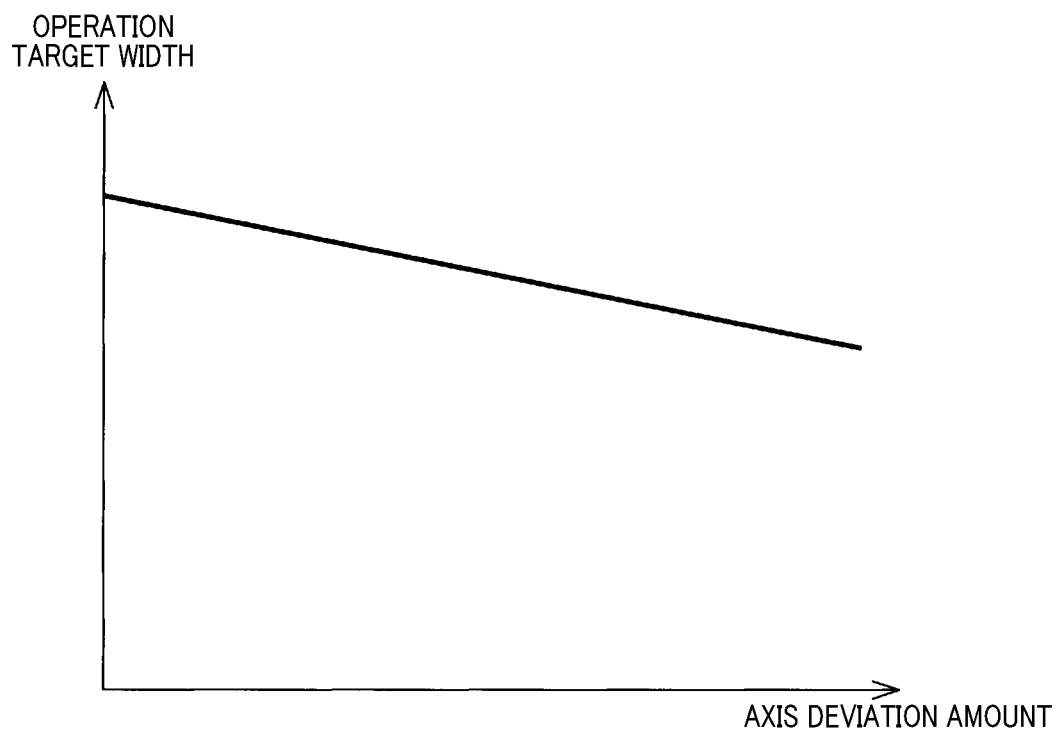
FIG. 11A is a drawing illustrating a relationship between an axial deviation amount and an operation target width.
Figure 11B:
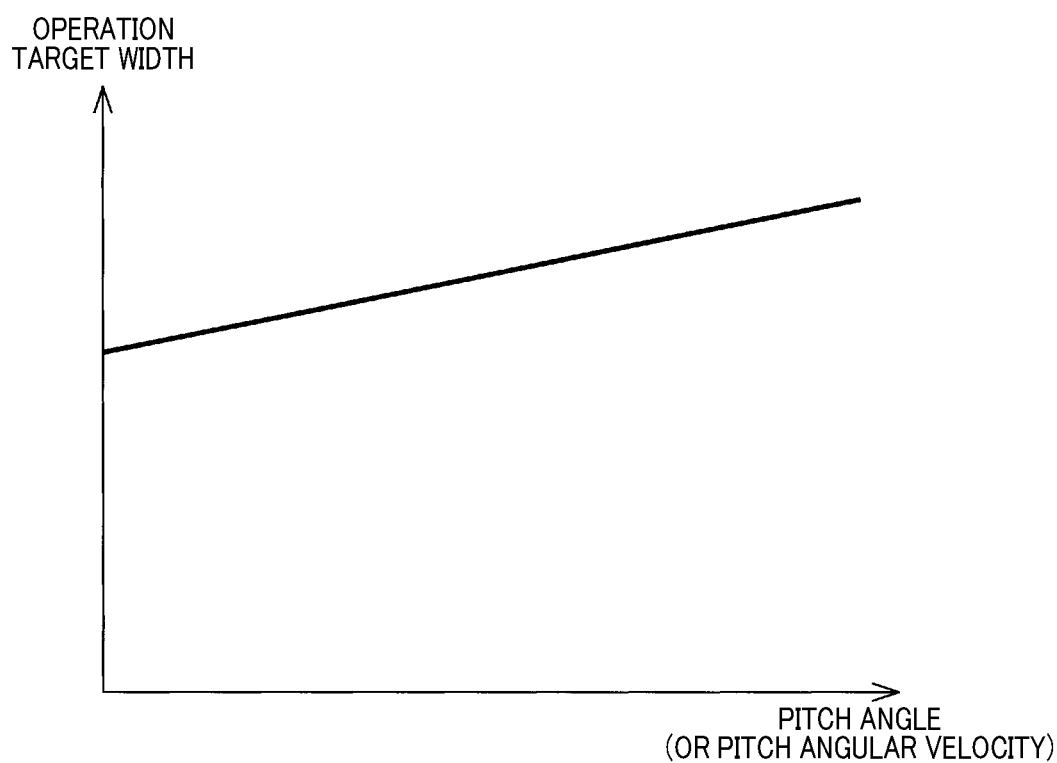
FIG. 11B is a drawing illustrating a relationship between a pitch angle and the operation target width or between a pitch angular velocity and the operation target width.

Next, the object width setting process, where the setting unit 40 of the second exemplary embodiment is performed by substituting for the object width setting process of the first exemplary embodiment in FIG. 6, will be described with reference to a flow chart in FIG. 10. Furthermore, processes at steps S310 to S350, S370, and S380 in FIG. 10 are same as those at steps S210 to S250, S270, and S280 such that descriptions are partly simplified.

When the process starts off, the setting unit 40, for example, reads out the piece of information showing the overlapping region with respect to the object, which is the operation target of the PCS, from the memory 14 in the chronological order, and determines whether or not the area of the read-out overlapping region is greater than the prescribed threshold area at step S310.

Next, it is determined whether or not the change amount between the value this time and the value at the previous time relating to the Y axis direction length of the read-out overlapping region at step S310 is lower than the prescribed Y axis threshold change amount at step S320. When the change amount is determined to be lower than the Y axis threshold change amount, the process is moved to step S330, and when the change amount is determined to be greater than the Y axis threshold change amount, the process returns to step S310.

Next, it is determined whether or not the change amount between the value this time and the value at the previous time relating to the X axis direction length of the read-out overlapping region at step S310 is lower than the prescribed X axis threshold change amount or not at step S330. When the change amount is determined to be lower than the X axis threshold change amount, the process is moved to step S340, and when the change amount is determined to be greater than the Y axis threshold change amount, the process returns to step S310.

Next, the setting command, by which the operation target width after the automatic-brake-operation start is enlarged, is outputted to the operation permission unit 30 at step 340.

Continuously, the axis deviation information is acquired from the axis deviation information acquisition unit 36, and it is determined whether or not the axis deviation occurs at least one of the image sensor 2 and the radar sensor 4, based upon the acquired axis deviation information at step S350. When it is determined that the axis deviation occurs, the process is moved to step S360, and when it is determined that the axis deviation does not occur, the process is moved to step S370.

At step S360, the operation target width is variably set to be reduced according to the axis deviation amount, based upon the axis deviation information at step S350. More specifically, as depicted in 11(A), as the axis deviation amount is great, the operation target width is changed to a small value. More in detail, the setting command, by which the operation target width of the automatic-brake-operation start is reduced, is transmitted to the operation permission unit 30. The setting command is a command for reducing the operation target width with respect to the enlarged operation target width, and, for example, includes quantitative information on which the usual operation target width (that is, an initial value) is specified as a lower limit.

On the other hand, the detection information is acquired from the vehicle information acquisition unit 42, and it is determined whether or not the pitch angle of the own vehicle or the pitch angular velocity thereof is greater than the predetermined value, based upon the acquired detection information at step S370.

At step S380, the process is variably set to enlarge the operation target width according to the pitch angle of the own vehicle or the pitch angular velocity thereof, based upon the detection information at step S370. More specifically, as depicted in FIG. 9B, as the pitch angle or the pitch angular velocity is great, the operation target width is changed to a great value. More in detail, the setting command, by which the operation target width after the automatic-brake-operation start is enlarged, is outputted to the operation permission unit 30. The setting command is a command for enlarging the operation target width with respect to the currently set operation target width and, for example, includes the quantitative information on which enlarging the width by about 20% in comparison with the usual operation target width (that is, an initial value) is specified as an upper limit.

2-3. Effect

According to the second exemplary embodiment described above, the aforementioned effects (1a)-(2a) of the first exemplary embodiment and effects to be hereinafter described are able to be accomplished.

(1b) In the target width setting process, for example, in a case where deterioration of the detection reliability caused by the axis deviation of the radar sensor 4, and the like as another cause other than the pitching motion of the own vehicle occurs, the automatic brake operation is able to be configured not to easily continue, so as to reduce the operation target width according to the axis deviation amount of the radar sensor 4.

(2b) In the target width setting process, the automatic brake operation is able to be more effectively configured not to be easily released after more preferably absorbing the deterioration of the detection reliability caused by the pitching motion of the own vehicle, so as to enlarge the operation target width according to the pitch angle of the own vehicle and the pitch angular velocity thereof.

3. Other Embodiment

As described above, the exemplary embodiments of the present invention are described with reference to the specific examples. However, it is understood that the present invention is not limited to the disclosed specific embodiments. That is, modifications with respect to such specific embodiments preferably designed by those skilled in the art are also intended to cover the scope of the present invention as long as they include characteristics of the present invention.

(3A) In the exemplary embodiments described above, when it is determined that the axis deviation occurs at least one of the image sensor 2 and the radar sensor 4, the threshold change amount or the operation target width is reduced in the target width setting process, however it is understood that the present invention is not limited thereto. For example, the threshold change amount or the operation target width may be reduced only when it is determined that the axis deviation occurs at the radar sensor 4.

(3B) A function that one component has in the exemplary embodiments may be divided as a plurality of components, or functions that a plurality of the components have therein may be integrated into one component. Furthermore, at least one portion of the configurations of the exemplary embodiments may be substituted by a well-known configuration including the same function. In addition, one portion of the configurations of the exemplary embodiments may be omitted. Furthermore, at least one portion of the configurations of the exemplary embodiments may be added or substituted for configurations of other exemplary embodiments. Additionally, all of the embodiments which are included in technological ideas specified by only words described in the scope of patent claims are the exemplary embodiments of the present invention.

(3C) Apart from the above-mentioned driving assistance device 1, the present invention is able to be accomplished by various embodiments such as a system having the driving assistance device 1 as a component, one or a plurality of programs for operating a computer as the driving assistance device 1, one or a plurality of media recording at least one portion of the programs, a driving assistance method, and the like.

The present disclosure is described based on the exemplary embodiments. However, it is understood that the present disclosure should not be limited to the exemplary embodiments and structures. The present disclosure are intended to cover various modifications and equivalent arrangement or substitutes included within the spirit and technology scope of the present disclosure. Additionally, various combinations and shapes, furthermore, other combinations including only one element thereof, more than thereof, or less than thereof are also included within the category and technology scope of the present disclosure.

DESCRIPTION OF THE REFERENCE NUMERALS

1 . . . Driving assistance device
2 . . . Image sensor
4 . . . Radar sensor
6 . . . Navigation device
8 . . . In-vehicle LAN
10 . . . Driving assistance control unit
12 . . . CPU
14 . . . MEMORY
16 . . . ECU
18 . . . Control target
22 . . . Image object acquisition unit
24 . . . Radar object acquisition unit
26 . . . FSN generation unit
28 . . . Arrival position calculation unit
30 . . . Operation permission unit
32 . . . Collision determination unit
34 . . . Overlapping region extraction unit
36 . . . Axis deviation information acquisition unit
38 . . . Process permission unit
40 . . . Setting unit
42 . . . Vehicle information acquisition unit
50 . . . Radar detection error region
60 . . . Image detection error region

The invention claimed is:

1. A driving assistance device, comprising:
a radar object acquisition means configured to acquire detection information including an object position detected based upon a reflected wave of a radar wave transmitted frontward from an own vehicle;
an image object acquisition means configured to acquire detection information including the detected object position based upon an image on which a frontward from the own vehicle is captured;
an arrival position calculation means configured to specify the object position on an XY plane in a case where a vehicle width direction is defined as an X axis and a vehicular longitudinal direction is defined as a Y axis based upon an own vehicle position, and configured to calculate a predicted arrival position when the object arrives at the X axis based upon a calculated travel trajectory by calculating the travel trajectory of the object on the XY plane based upon object positions specified a plurality of times;
an operation permission means configured to permit automatic brake operation based upon a collision determination between the own vehicle and the object, when the predicted arrival position calculated by the arrival position calculation means falls within a range of a preset operation target width along the X axis from the own vehicle position;
an overlapping region extraction means configured to set detection error regions on the XY plane, respectively, based upon the object position included in detection information acquired by the radar object acquisition means and the image object acquisition and configured to extract a region where both detection error regions set are overlapped with each other as an overlapping region; and
a setting means configured to perform an object width setting process which i) enlarges an operation target width in the operation permission means after an automatic-brake-operation start when a prescribed characteristic amount condition is satisfied, and ii) does not enlarge the operation target width when the prescribed characteristic amount condition is not satisfied, with respect to a characteristic amount relating to a size of the overlapping region extracted by the overlapping region extraction means.

2. The driving assistance device according to claim 1, wherein the setting means has a requirement for satisfying the characteristic amount requirement, where an area of the overlapping region as the characteristic amount is greater than a prescribed threshold area.

3. The driving assistance device according to claim 1, wherein the setting means has a requirement for satisfying the characteristic amount requirement, where change amounts of an X axis direction length and a Y axis direction length in the overlapping region as the characteristic amount are lower than a preset X axis threshold change amount and a preset Y axis threshold change amount, respectively.

4. The driving assistance device according to claim 3, wherein the Y axis threshold change amount is set to be a value greater than the X axis threshold change amount.

5. The driving assistance device according to claim 3, wherein the setting means performs a threshold setting process by which at least one of the threshold amounts corresponding to an axis deviation direction from a reference axis is reduced in the X axis threshold change amount and the Y axis threshold change amount, according to an axis deviation amount with respect to the prescribed reference axis relating to at least one sensor of a radar sensor transmitting the radar wave and an image sensor capturing the image in a target width setting process.

6. The driving assistance device according to claim 3, wherein the setting means performs a Y axis threshold setting process by which the Y axis threshold change amount is enlarged according to a pitch angle of the own vehicle and a pitch angular velocity thereof in the target width setting process.

7. The driving assistance device according to claim 1, wherein the setting means performs a process by which the operation target width is reduced according to the axis deviation amount with respect to the prescribed reference axis relating to at least one sensor of the radar sensor transmitting the radar wave and the image sensor capturing the image in the target width setting process.

8. The driving assistance device according to claim 1, wherein the setting means performs a process by which the operation target width is enlarged according to the pitch angle of the own vehicle and the pitch angular velocity thereof in the target width setting process.

9. The driving assistance device according to claim 1, further comprising a process permission means by which execution of the process according to the setting means is permitted when the own vehicle is travelling straight.

10. A driving assistance method, comprising:
a radar object acquisition process configured to acquire detection information including an object position detected based upon a reflected wave of a radar wave transmitted frontward from an own vehicle;

an image object acquisition process configured to acquire detection information including the detected object position based upon an image on which a frontward view from the own vehicle is captured;

an arrival position calculation process configured to specify the object position on an XY plane in a case where a vehicle width direction is defined as an X axis and a vehicular longitudinal direction is defined as a Y axis based upon an own vehicle position, and configured to calculate a predicted arrival position when the object arrives at the X axis based upon a calculated travel trajectory by calculating the travel trajectory of the object on the XY plane based upon object positions specified a plurality of times;

an operation permission process configured to permit automatic brake operation based upon a collision determination between the own vehicle and the object, when the predicted arrival position calculated by the arrival position calculation means falls within a range of a preset operation target width along the X axis from the own vehicle position;

an overlapping region extraction process configured to set detection error regions on the XY plane, respectively, based upon the object position included in detection information acquired by the radar object acquisition means and the image object acquisition and configured to extract a region where both detection error regions set are overlapped with each other as an overlapping region; and a setting process 40 configured to perform an object width setting process which i) enlarges an operation target width in the operation permission means after the automatic-brake-operation start when a prescribed characteristic amount condition is satisfied, and ii) does not enlarge the operation target width when the prescribed characteristic amount condition is not satisfied, with respect to a characteristic amount relating to a size of the overlapping region extracted by the overlapping region extraction means.

11. The driving assistance method according to claim 10, wherein the setting process has a requirement for satisfying the characteristic amount requirement, where an area of the overlapping region as the characteristic amount is greater than a prescribed threshold area.

12. The driving assistance method according to claim 10, wherein the setting process has a requirement for satisfying the characteristic amount requirement, where change amounts of an X axis direction length and a Y axis direction length in the overlapping region as the characteristic amount are lower than a preset X axis threshold change amount and a preset Y axis threshold change amount, respectively.

13. The driving assistance method according to claim 12, wherein the Y axis threshold change amount is set to be a value greater than the X axis threshold change amount.

14. The driving assistance method according to claim 12, wherein the setting process performs a threshold setting process by which at least one of the threshold amounts corresponding to an axis deviation direction from a reference axis is reduced in the X axis threshold change amount and the Y axis threshold change amount, according to an axis deviation amount with respect to the prescribed reference axis relating to at least one sensor of a radar sensor transmitting the radar wave and an image sensor capturing the image in a target width setting process.

15. The driving assistance method according to claim 12, wherein the setting process performs a Y axis threshold setting process by which the Y axis threshold change amount is enlarged according to a pitch angle of the own vehicle and a pitch angular velocity thereof in the target width setting process.

16. The driving assistance method according to claim 11, wherein the setting process performs a process by which the operation target width is reduced according to the axis deviation amount with respect to the prescribed reference axis relating to at least one sensor of the radar sensor transmitting the radar wave and the image sensor capturing the image in the target width setting process.

17. The driving assistance device according to claim 11, wherein the setting process performs a process by which the operation target width is enlarged according to the pitch angle of the own vehicle and the pitch angular velocity thereof in the target width setting process.

18. The driving assistance method according to claim 11, further comprising a process permission process by which execution of the process according to the setting process is permitted when the own vehicle is travelling straight.

* * * * *